United States Patent
Muniyappa et al.

Patent Number: 6,092,200
Date of Patent: Jul. 18, 2000

[54] METHOD AND APPARATUS FOR PROVIDING A VIRTUAL PRIVATE NETWORK

[75] Inventors: Umesh Muniyappa, Cupertino; Alampoondi Eswaran Natarajan, San Jose, both of Calif.; Radia Joy Porlman, Acton, Mass.; Nicholas Michael Brailas, San Jose; Michael Terzich, Fremont, both of Calif.

[73] Assignee: Novell, Inc., Provo, Utah

[21] Appl. No.: 08/904,817

[22] Filed: Aug. 1, 1997

[51] Int. Cl.$^7$ .................................................. H04L 9/00
[52] U.S. Cl. ........................... 713/201; 713/100; 713/150
[58] Field of Search .................................. 713/100, 150, 713/162, 163, 168

[56] References Cited

U.S. PATENT DOCUMENTS 5,892,910  4/1999  Safadi ........................................ 709/217

OTHER PUBLICATIONS

Schneier, "Applied Cryptography", 1995. pp. 17, 34, 35, 519.

Primary Examiner—Thomas R. Peeso
Attorney, Agent, or Firm—Cesari and McKenna, LLP

[57] ABSTRACT

A method and apparatus for establishing a virtual private network provides a technique for automatically configuring nodes of the network. The nodes are established to include a master node. Each node includes a public key and a private key for cryptographic communication in a first mode, such as RSA. Configuration data regarding communication in the network is provided to the master node. The configuration data is securely transferred into each other node from the master node. Nodes communicate with each other based upon a configuration data. The configuration data can include cryptographic key data related to a second cryptographic mode such as Diffie-Hellman.

6 Claims, 2 Drawing Sheets

METHOD AND APPARATUS FOR PROVIDING A VIRTUAL PRIVATE NETWORK

FIELD OF THE INVENTION

The present invention relates generally to a method and apparatus for providing a virtual private network and more particularly to a system for automatically establishing a series of secure network links between predetermined sites connected by a public internet or intranet.

BACKGROUND OF THE INVENTION

Security is a significant concern in the communication between computer networks over a public network. Public networks, such as various institutional intranets and the well-known Internet enable large numbers of diverse users to establish communication links between each other. A series of servers and switching systems route packets of data between various users based upon addresses using communication protocols such as TCP/IP. Packets of data move between senders and recipients through a variety of pathways that are often open to public scrutiny. In other words, unauthorized third parties can sometimes gain access to data as it travels between authorized senders and recipients.

As such networks become increasingly used for important commercial transactions, special care must be taken to protect sensitive data as it travels through the network. Various cryptography procedures are now employed regularly to ensure that intercepted messages cannot be interpreted by unauthorized users. A common form of cryptography is public key cryptography such as the well-known RSA standard. In public key cryptography, each principal in a communication link has a public encryption key and a private encryption key. The two principals can communicate knowing only each other's public keys. An encryption key is a code or number, which, when taken together with an encryption algorithm, defines a unique transformation used to encrypt or decrypt data. Operation of a public key cryptography system to ensure authentication may be understood without reference to the mathematical transformations that are used for encryption and decryption. Public key cryptography is also referred to as "asymmetric" encryption because information encoded with a public key may be decoded only by using a complimentary private key, the associated public and private keys defining a unique key pair. According to this form of encryption, the private key is known only to the owner of the key, while the public key is known to other principals in the system.

To effect a secure transmission of information to a recipient, a principal encodes or "encrypts," the information with the recipient's public key. Since only the intended recipient has the complimentary private key, only that principal can decode or "decrypt" the information. Conversely, to prove to a recipient of information that the sender is authentic, the sender encodes or "signs," the information with its private key. If the recipient can decode, or "verify," the information, it can be sure that the sender has correctly identified itself. In public key cryptography, each principal is responsible for knowing its own private key and all the public keys are generally accessible from one location, typically a directory service.

Generally, each of the principals is provided with a private key by an insecure transfer. In other words, the private key is generated by a certification authority or "CA," and then is manually delivered to the appropriate principal by mail or hand delivery of a disk or other data storage device. The CA stores each users public key and each public key can be downloaded from the CA when needed by another sender. The certification authority generates "certificates" or signed messages that specify the name of the public key holder to verify its identity.

Public key encryption systems like RSA are highly effective in generating secure links between parties. However, RSA is a slow system; as a result, it is often used only to encrypt the data necessary to establish secret key links. Faster secret key systems such as DES are often employed for actual data transfer. Data in such a secret key system is encrypted using a secret key that is shared by both the sender and the recipient of the data.

It is increasingly desirable to construct a "virtual private network" (VPN) in which data links between selected senders and recipients in, for example, a widely distributed corporate computer system, are established directly between each other. Since the network is not, itself, a direct wire between sites, a virtual (logical) "tunnel" is established instead. Through the use of cryptography keys and configuration data a system administrator can create logical linkages between sites or "nodes" that allow data to be transmitted without the risk of interception by unauthorized users. In addition, sites can be configured so that communication can only occur in a specific manner (e.g. from a first node to a second node and from a second node to a third node but not from a first node to a third). Typically such configuration data must be entered manually at each local node site. This process is time consuming and the configuration data is, thus, not easily altered when the network is updated.

In view of these disadvantages, it is an object of this invention to provide a method for establishing a virtual private network between certain selected nodes linked by a network. Cryptography keys for use in communication between nodes should be delivered to all nodes in the virtual private network in a secure manner. Configuration data that regulates communication between the nodes should also be delivered automatically to each of the nodes in the virtual private network without manual intervention at each of the nodes.

SUMMARY OF THE INVENTION

The invention comprises a technique for automatically configuring selected nodes linked by a public network to establish a virtual private network (VPN). The novel technique of this invention overcomes disadvantages of the prior art because only a single one of the selected nodes need be provided with configuration information defining the communication links of the VPN. This information is then electronically transferred to other nodes by operation of secure communication transfers to thereby enable communication among the nodes of the VPN in accordance with the desired configuration scheme.

According to a preferred embodiment, the nodes are initially configured to establish a "master" node for storing the configuration information related to the specified communication links in the VPN. Each node stores a public key and a private key for secure communication in a first cryptographic mode, such as public key cryptography. The configuration data is securely and electronically transferred to each of the other "slave" nodes from the master node in encrypted form using the first cryptographic mode.

As part of the secure electronic transfer of configuration data, a signature data packet is preferably provided. The signature data packet is encrypted by the master node using the first cryptographic mode, and subsequently decrypted by each slave node upon receipt. A checksum routine can be used to verify the signature, and only verified data packets are accepted by the various slave nodes in the virtual private network.

The encrypted data packets received by the slave nodes also contain information formatted in a second cryptographic mode, such as the Diffie-Hellman technique. This information is used to establish shared secrets between nodes for use in a high-speed, secret key cryptography embodiment of the VPN. Typically the nodes exchange information to derive the final, agreed-upon secret keys. Once in possession of the configuration data and secret keys, the nodes may effect selective secure communication among one another according to that data. All subsequent data transfers are encrypted according to the high-speed secret key system.

BRIEF DESCRIPTION OF THE DRAWINGS

For a fuller understanding of the nature of the invention, reference should be made to the following detailed description taken in connection with the accompanying drawings in which.

DETAILED DESCRIPTION OF AN ILLUSTRATIVE EMBODIMENT

Figure 1:
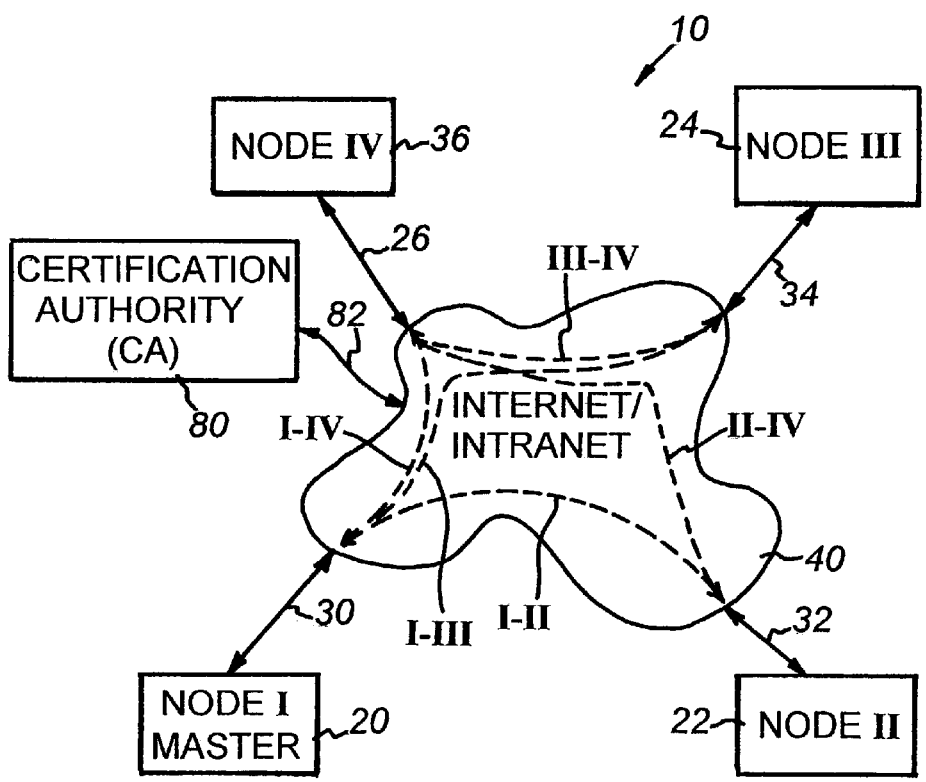
FIG. 1 is a diagram of a virtual private network established according to this invention.
Figure 2:
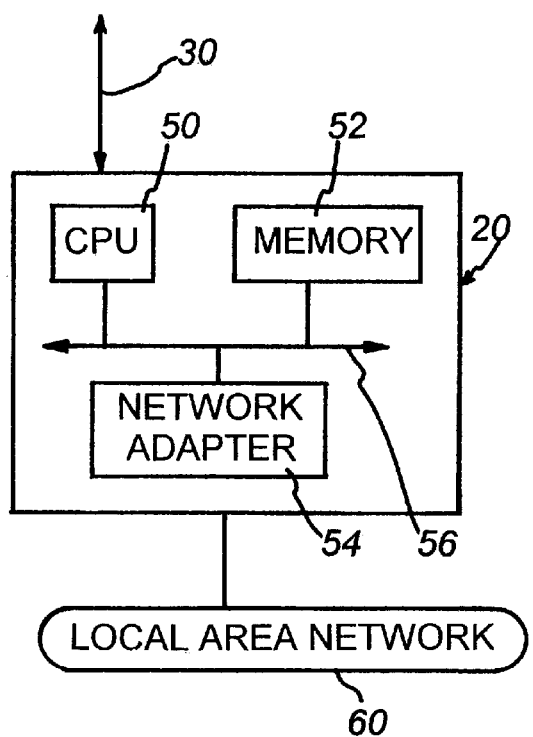
FIG. 2 is a diagram of a typical network node according to this invention.

FIG. 1 illustrates a simplified virtual private network (VPN) 10 established according to this invention. In this embodiment, four nodes 20, 22, 24 and 26, respectively labeled Nodes I–IV define the virtual private network. Each of the nodes 20, 22, 24 and 26 are linked by respective links 30, 32, 34 and 36 to a public network such as the Internet or a semi-public, institutional intranet 40. For the purposes of description, each node 20, 22, 24 and 26 can be considered a constituent of a local network. A typical node, such as Node I (20) is shown in greater detail in FIG. 2.

The node 20 comprises a central processing unit (CPU) 50, a memory unit, 52 and at least one network adapter 54 all connected to the system bus 56. The memory unit 52 can comprise storage locations typically composed of random access memory (RAM) devices, which are addressable by the CPU 50 and network adapter 54. The memory unit typically provides age of information, such as executable processes and contents of data packets transferred through the node. An operating system, portions of which are typically resident in memory and executed by the CPU, functionally organizes the node by, inter alia, invoking network operations in support of those processes executing in the CPU.

The node 20 functions as a gateway or "firewall" between localized computers or networks, such as the local area network (LAN) 60. The LAN 60 in this example accesses the public network 40 by the link 30. The node 20 can also connect to a wide area network (WAN). A LAN is a limited area network, while a WAN may be a public or private telecommunications facilities that interconnects nodes widely disbursed using communication links. As noted above, communication among nodes coupled to these networks is typically effected by exchanging discrete data "packets" specifying addresses of source and destination nodes.

In its function as a firewall the node operates to read data packets entering from the public network to verify that such packets are authorized to enter the node. Unauthorized packets are rejected. In determining authorization, headers and other identifiers within the packets are read to determine the source and the destination of the packet; where applicable, the packet data is decrypted using appropriate cryptography techniques such as the public key cryptography technique described above.

The node address is preferably specified as an IP layer address although other communication protocols, such as Novell's IPX™, can be used in accordance with the teachings described herein. Packets that pass through the fire-wall are transferred to the LAN 60 where predefined sub-network addresses ensure proper routing of the packet over the LAN 60 to the proper destination.

Referring again to FIG. 1, the overall communications scheme includes a series of desired "logical" links between Node I (20), Node II (22), Node III (24) and Node IV (26) through the public network 40 as specified by a certain "configuration." A "configuration," as used herein, refers to the ability of nodes to communicate with each other over the established logical links using the virtual private network of this invention. Notably, only certain links are allowed; each allowed link being depicted in FIG. 1 according to Sender-Receiver notation. That is, Link I-II refers to an authorized communication between Node I (20) and Node II (22). Likewise, Links I-III, I-IV, II-IV and III-IV refer to authorized communication between Nodes I and III, I and IV, II and IV and III and IV, respectively. Hence, Node II (22) cannot communicate directly with Node III (24) according to the illustrated arrangement.

Two-way communication for each link is denoted by a double arrow while one way communication is denoted by a single arrow. For example, Link III-IV indicates a one-way link from Node III (24) to Node IV (26). Node IV cannot initiate communication with Node III according to this arrangement. It should be noted that TCP verification data and other required signature data according to the various cryptography schemes used herein can be transferred back from Node IV to Node III as required.

The system of FIG. 1 includes a certification authority 80 linked to the public network 40 by a data link 82. While the specific connections are not shown, it is assumed that the certification authority 80 can communicate with each and every one of the nodes 20, 22, 24 and 26. As discussed above the certification authority 80 is a trusted node that generates private and public key pairs according to the RSA or another standard public key cryptography. The private keys are originally delivered to each node using an insecure method such as electronic mail (E-mail) or physical delivery of a disk or other storage medium to each node site. The certification authority 80 then retains a public key for each node, which is accessible by all other nodes in the network when needed.

Figure 3:
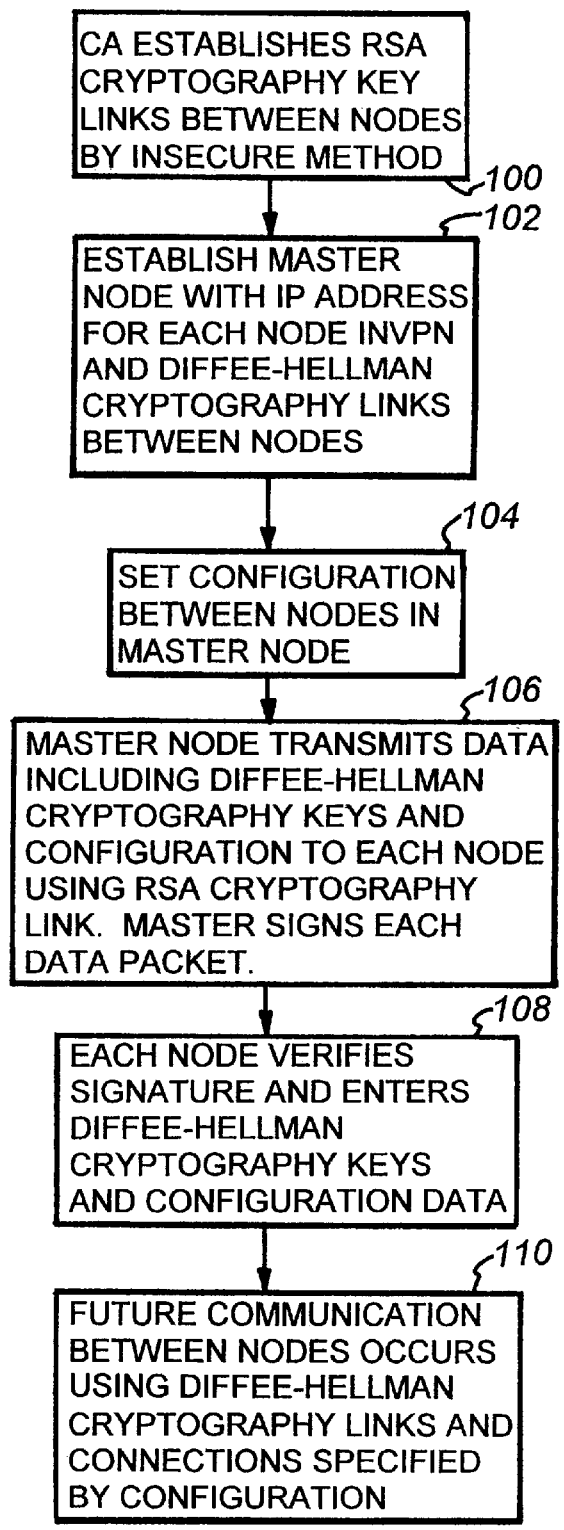
FIG. 3 is a block diagram describing the procedure for establishing a virtual private network according to this invention.

FIG. 3 is a flowchart that illustrates the sequence of steps for establishing a virtual private network according to this invention. As noted above, the certification authority 80 first establishes public key cryptography links between the nodes 20, 22, 24 and 26 in step 100. Private keys are generally delivered to the site of each node by an actual physical delivery or by E-mail.

In step 102, one of the nodes 20 is designated as a master node. A master node is chosen generally on its central location, access to significant users such as systems administrators, enhanced security or other desired characteristics. Any node in the network can be deemed a master node, but generally only a single node will be the master node. The other nodes 22, 24 and 26 can be termed "slave nodes" for the purpose of this description. The user, typically a system administrator, provides: the master node 20 with the address for each slave node 22, 24 and 26 in the network. Of course, the address of the certification authority 80 is also provided. The master node is also provided with Diffie-Hellman public cryptography keys for each node. Before further discussing the process of establishing the virtual private network, a brief description of the well-known Diffie-Hellman cryptography technique is provided.

The Diffie-Hellman technique is a public key technique. It is a higher speed technique than RSA, but does not enable the signing of messages for authentication purposes. According to the Diffie-Hellman technique, the communicating nodes agree on a shared public value key. The term "key" will be used to describe this value. Using an exchange of messages, the shared public key is derived into secret keys that are unique to each node. These secret keys are then employable in any number of secret key cryptography techniques, such as DES, for actual data encryption of messages between nodes. Note that in step 102 the basic Diffie-Hellman public key is established.

In step 104, a system administrator manually provides the master node 20 with configuration information relating to the authorized communication between nodes. This information includes addresses for allowed communication links between nodes. Hence, unlike the prior art where each node is independently configured by system administrator, all configuration information for the network is provided solely to the master node 20. A particular example of a desired communication arrangement! is described above. Note that the master node 20 should be able to communicate in two directions with each slave node 22, 24 and 26 in the network.

In step 106 the master node 20, having all configuration, RSA and Diffie-Hellman data relative to the slave nodes 22, 24 and 26, now transmits data packets to each of the other nodes over the public network 40. The packets are initially encrypted using RSA or another acceptable public key technique. The master node 20 signs each packet with the master's private key. In step 108, each node verifies the signature to determine whether or not to accept the initial packet by decrypting the signature packet with the master's public key. A checksum function in each node typically checks the decrypted signature for correctness to complete the authentication process. As noted, all nodes have access to the certification authority and can, thus, download the master's public key by querying the certification authority with the master's address information. In other words, each node receives a message packet that includes address information of the master. Each node queries the certification authority to receive the public key by providing the certification authority with the master's address information so that the certification authority can look-up the appropriate public key for the master based upon its address information. This public key information is then transferred to each requesting node. According to this invention, the use of cryptography techniques and signature authentication techniques to effect electronic delivery of data can be defined as a "secure" transfer wherein the risk of unauthorized receipt and use of the data is reduced.

After decrypting the signature information, each node reads the configuration and Diffie-Hellman public key data by decrypting the RSA-encrypted message. Again, the actual message as opposed to the signature is encrypted using the specific node's public key and that node then decrypts the information using its own private key.

As generally detailed in step 110, once the data has been decrypted and read by each node, it is loaded into each node's memory 52 by conventional processes. The configuration is used by the node's CPU to regulate transmission and receipt of information to other nodes as described above. Likewise, Diffie-Hellman information received by each node is acted upon, and each node begins communication with other nodes in the network, according to the configuration scheme, to establish shared secret keys between nodes. In an embodiment of the invention a conventional SKIP protocol can be used to generate a particular shared secret to be used between each specified pair of nodes. All further communication now occurs between nodes according to the configuration scheme using shared secrets to encrypt data.

It should be clear that restructuring of the virtual public network 10 to add or subtract nodes or change the configuration scheme can be implemented quickly and simply by entering new information into the master node 20. Initial set-up and, subsequent changes to the initial set-up, are considered to occur "automatically" in that manual operations by a system administrator need only occur at the master node once initial RSA private keys have been delivered to participating nodes. Delivery of configuration information occurs "automatically" by operation of the master node to effect secure electronic delivery of the information to each node in the normal course of operation.

The foregoing has been a detailed description of a preferred embodiment. Various modifications and additions can be made without departing from the spirit and scope of this invention. For example, the particular cryptography schemes used herein can be varied to suit the users' needs. Additionally, a variety of network arrangements and subnetworks can be located downstream of each node or firewall. Appropriate addresses are provided to access these regions. Accordingly, this description is meant to be taken only by way of example and not to otherwise limit the scope of the invention.

What is claimed is:

1. A method for establishing a virtual private network including a master node, and slave nodes, the method comprising:

establishing a plurality of nodes by a public network, and each of the nodes including a public key and a private key in a first cryptographic mode;

providing in the master node configuration information that defines allowable virtual private network communication links between each of the nodes;

securely and electronically transferring the configuration information to each of the slave nodes from the master node; and establishing the virtual private network links among each of the nodes based upon the configuration information.

2. The method as set forth in claim 1 wherein the step of securely and electronically transferring the configuration information includes transferring the configuration information in encrypted form in the first cryptographic mode.

3. The method as set forth in claim 2 further comprising securely transferring cryptographic key data related to a second cryptographic mode from the master node to each of the slave nodes in an encrypted form in the first cryptographic mode.

4. The method as set forth in claim 3 further comprising providing a first cryptographic mode that comprises RSA cryptography and providing a second cryptographic mode that comprises Diffie-Hellman cryptography.

5. The method as set forth in claim 4 wherein the step of securely and electronically transferring the configuration data includes providing signature data in the configuration data and authenticating the signature data at each of the slave nodes.

6. The method as set forth in claim 1 wherein the step of securely and electronically transferring the configuration information includes transferring information to each of the slave nodes that includes an address of at least one other of the nodes.

* * * * *